United States Patent [19]
Li et al.

[11] Patent Number: 5,691,789
[45] Date of Patent: Nov. 25, 1997

[54] SINGLE-LAYER REFLECTIVE SUPER BROADBAND CIRCULAR POLARIZER AND METHOD OF FABRICATION THEREFOR

[76] Inventors: Le Li, 3491 Overlook Ave., Yorktown Heights, N.Y. 10598; Sadeg Mustafa Faris, 24 Pocantico River Rd., Pleasantville, N.Y. 10570

[21] Appl. No.: 550,022

[22] Filed: Oct. 30, 1995

[51] Int. Cl.$^6$ .............. G02F 1/1335; G02F 1/13; C09K 19/36; G02B 5/30
[52] U.S. Cl. .............. 349/98; 349/194; 252/299.7; 252/585; 359/500
[58] Field of Search .............. 359/65, 37, 51, 359/52, 500, 490, 492; 252/299.7, 585; 349/98, 194

[56] References Cited

U.S. PATENT DOCUMENTS

| | | | |
|---|---|---|---|
| 3,650,603 | 3/1972 | Heilmeier et al. | 252/299.7 |
| 4,388,453 | 6/1983 | Finkelmann et al. | 252/299.7 |
| 4,637,896 | 1/1987 | Shannon | 252/299.7 |
| 4,944,578 | 7/1990 | Denison | 349/6 |
| 5,412,492 | 5/1995 | Zammit et al. | 349/1 |
| 5,427,828 | 6/1995 | Park | 359/75 |
| 5,506,704 | 4/1996 | Broer et al. | 359/65 |

FOREIGN PATENT DOCUMENTS

| | | | |
|---|---|---|---|
| 0 506 176 | 9/1992 | European Pat. Off. | 252/585 |
| 0606940 | 7/1994 | European Pat. Off. | |

*Primary Examiner*—William L. Sikes
*Assistant Examiner*—Walter T. Malinowski
*Attorney, Agent, or Firm*—Thomas J. Kilgannon

[57] ABSTRACT

The present invention relates generally to broadband, reflective circular polarizers and, more particularly, to single layer super broadband, reflective circular polarizers. The polarizers of the present invention are made from a film of material, like a polymer having a cholesteric order, in which a second liquid crystal material, like a nematic liquid crystal, is distributed in a non-linear fashion across the thickness of the film in a plurality of liquid crystal-rich and liquid crystal-depleted sites in the polymer. The resulting polarizers have band passes approaching 2000 nm and reflect circularly polarized light which is either left-handed or right-handed depending on the final spiral structure of the materials utilized. The material of the present invention is fabricated by mixing commercially available polymers having a cholesteric order, a second liquid crystal material and a photo-initiator at a temperature which maintains the mixture in a liquid state. The polymer and the liquid crystal are present in a ratio by weight of 1:2, for example, and the photoinitiator is present in an amount of 0.6% by weight, for example, in the mixture. The heated mixture is then subjected to actinic radiation for a time and at an intensity sufficient to polymerize the polymer or the liquid crystal material or both. Under all polymerizing conditions the segregation rate of the liquid crystal material has to be greater than the polymerization rate of the material being polymerized. The liquid crystal segregates and diffuses, during polymerization, to sites of enlarged pitch in the polymer material from sites of shrunken pitch in the polymer material. Because the actinic light has an exponential intensity distribution due to light attenuation by, for example, light absorption, polymerization occurs in a non-linear fashion resulting in a non-linear distribution of the polymer and the liquid crystal material across the film.

68 Claims, 5 Drawing Sheets

SINGLE-LAYER REFLECTIVE SUPER BROADBAND CIRCULAR POLARIZER AND METHOD OF FABRICATION THEREFOR

BACKGROUND OF THE INVENTION

1. Field of Invention

The present invention relates generally to broadband, reflective circular polarizers and, more particularly, to single layer super broadband, reflective circular polarizers. The polarizers of the present invention are made from a film of material, like a polymer having a cholesteric order, in which a second liquid crystal material, like a nematic liquid crystal, is distributed in a non-linear fashion across the thickness of the film in a plurality of liquid crystal-rich and liquid crystal-depleted sites in the polymer. The resulting polarizers have band passes approaching 2000 nm and reflect circularly polarized light which is either left-handed or right-handed depending on the final spiral structure of the materials utilized.

The material of the present invention is fabricated by mixing commercially available polymers having a cholesteric order, a second liquid crystal material and a photoinitiator at a temperature which maintains the mixture in a liquid state. The polymer and the liquid crystal are present in a ratio by weight of 1:2, for example, and the photoinitiator is present in an amount of 0.6% by weight, for example, in the mixture. The heated mixture is then subjected to actinic radiation for a time and at an intensity sufficient to polymerize the polymer or the liquid crystal material or both. Under all polymerizing conditions the segregation rate of the liquid crystal material has to be greater than the polymerization rate of the material being polymerized. The liquid crystal segregates and diffuses, during polymerization, to sites of enlarged pitch in the polymer material from sites of shrunken pitch in the polymer material. Because the actinic light has an exponential intensity distribution due to light attenuation by, for example, light absorption, polymerization occurs in a non-linear fashion resulting in a non-linear distribution of the polymer and the liquid crystal material across the film. Hence, more specifically, an exponentially distributed pitch is generated from one surface to the other of the polarizer film. While it is believed that any non-linear distribution will produce a broadband polarizer in accordance with the teaching of the invention, a preferred embodiment herein is a polarizer having a exponentially distributed pitch from one surface to the other of the polarizer film.

The elimination of ultraviolet dye used in prior art and the use of polymer materials having a cholesteric order and non-cross linkable liquid crystal materials wherein the segregation rate of the latter is greater than the polymerization rate of the former have unexpectedly provided polarizers with bandwidths far in excess of those provided by prior art techniques.

2. Description of the Prior Art

The most recent prior art relating to broadband polarizers is European Patent Application 94200026.6 entitled Cholesteric Polarizer and Manufacture Thereof, published Jul. 20, 1994 and assigned to Philips Electronics, N.V. of Eindhoven, Netherlands. In this application, a broadband Cholesteric Liquid Crystal (CLC) polarizer is provided in a single layer of that material. The pitch of the CLC material changes linearly from the maximum at one film surface to a minimum at the other film surface. The pitch difference between the maximum and the minimum is greater than 100 nm. The prior art polarizer is formed from two polymerizable chiral and nematogenic monomers each of which has a different reactivity. If, during polymerization of the mixture by means of actinic radiation, a variation in radiation intensity is realized across the optically active layer, the most reactive monomer is preferentially incorporated into the least reactive monomer at the locations of the highest radiation intensity. As a result, at least one concentration gradient of free monomers is formed during polymerization causing the monomer to diffuse from locations with a low monomer concentration to location with a high concentration. The monomers of high reactivity diffuse to locations where the radiation intensity is highest. This results in an increase in reactive monomers in areas of the formed polymer material where, during polymerization, the radiation intensity is highest. The actinic radiation intensity gradient across the film is provided by introducing an ultraviolet (UV)) absorbing dye into the original mixture. As a result, the composition of the material varies in a direction transverse to the surfaces of the film. This causes a linear variation in the pitch of the molecular helices in the layer formed by the polymer. This variation in pitch provides the optically active layer with a large bandwidth, the value of which is proportional to the variation in the pitch.

In another fabrication approach, the spontaneous diffusion of monomers into a CLC polymer film followed by UV polymerization is utilized. A polymerized film of CLC material having a film of reactive monomers deposited on its surface is provided. The diffusion of monomers into the CLC layer causes a concentration gradient in the layer before diffusion is halted. As a result, the original CLC layer swells slightly leading to an increase in pitch. This provides a concentration gradient which, in turn, results in a linear variation in pitch across the film thickness. Polymerization of the layer by actinic radiation halts diffusion providing a broadband polarizer.

In contradistinction to the prior art reference in which the liquid crystal material is distributed linearly across the thickness of the film, the super broadband polarizer of the present application has a non-linear distribution of liquid crystal material across the thickness of a CLC film and, preferably, such a distribution is exponential in character. Also, while the materials of the prior art polarizer are both polymerizable, at least one of the CLC materials and the liquid crystal materials may be nonpolymerizable or of low molecular weight in the present invention. Another distinction is that, in the present approach no radiation absorptive dye is utilized. During polymerization, a non-linear (exponential) variation in radiation intensity is created due to light loss inside the medium which, in turn, permits a non-linear variation in pitch of the CLC material resulting in a super broadband polarizer. Still another distinction is that, while the polarizers of the prior art have bandwidths of about 400 nm, the polarizers of the present application have super bandwidths approaching 2000 nm. It appears that the elimination of the UV dye of the prior art teaching as well as the new compositions of the present invention leads to the non-linear pitch distribution resulting in a super broad band polarizer. The resulting single layer polarizers with such bandwidths also have improved spectral and band-pass position characteristics and may be combined with quarter and half-wave plates to provide well-known optical arrangements including notch-filters and the like.

SUMMARY OF THE INVENTION

The present invention relates to single layer, super broadband, reflective circular polarizers. The polarizers are made from a film or layer of a material, like a polymer having a cholesteric order, in which a second liquid crystal material, like a noncrosslinkable nematic liquid crystal, is distributed non-linearly across the thickness of the film or layer in a plurality of liquid crystal-rich and liquid crystal depleted sites in the polymer material. The resulting polarizers have band passes approaching 2000 nm and reflect either left-handed or right-handed circularly polarized light depending on the final spiral structure of the cholesteric liquid crystal utilized.

The super broadband polarizers of the present application may be fabricated by mixing commercially available polymers having a cholesteric order (CLC), a second liquid crystal material and a photoinitiator at a temperature which maintains the mixture in a liquid state. The second liquid crystal and CLC polymer are preferably present in a ratio by weight of 1:2 but may be present in a ratio range by weight of 1:1 to 1:6 depending on all the conditions involved. The photoinitiator is preferably present in an amount of 0.6% by weight in the mixture but may be present in higher or lower amounts as long as the amount is sufficient to initiate polymerization of the CLC material. In general, the amount of the photoinitiator introduced into the mixture should be such that the polymerization rate, when the mixture is exposed to actinic radiation, is slower than the segregation rate of the liquid crystal. The mixture is heated, preferably at a temperature of 92° C., and subjected to ultraviolet light for a time and at an intensity sufficient to polymerize the CLC polymer or the second liquid crystal or both. The segregation rate of the liquid crystal material should be, under all conditions, greater than the polymerization rate of the material being polymerized.

The materials involved are generally commercially available and, although single constituent liquid crystals and liquid crystal polymers may be used, these commercially available materials usually consist of a plurality of constituents.

It is, therefore, an object of the present invention to provide polarizers which have greater bandwidths than prior art polarizers.

Another object is to provide a polarizer of great bandwidth in a single layer.

Another object is to provide single layer polarizers of extremely broad bandwidth wherein the liquid crystal component of the polarizer assumes a non-linear distribution across the thickness of the polarizer.

Still another object is to provide a method of fabricating extremely broadband polarizers which have a wide spectral band pass, low optical loss, high polarizing efficiency and low cost.

Yet another object is to provide a method of fabricating extremely broadband polarizers wherein the segregation rate of one liquid crystal material is always greater than the polymerization rate of the material being polymerized.

Yet another object is to eliminate the need for a UV absorbing dye, thereby simplifying fabrication and reducing cost.

The foregoing and other object and features of the present invention will become apparent from the following more detailed description of preferred embodiments taken in conjunction with the accompanying drawings.

DESCRIPTION OF PREFERRED EMBODIMENTS

Before providing detailed description of preferred embodiments of the present invention, a discussion of the mechanism involved in obtaining super broadband polarizers is warranted because the unexpected results appear to flow from generating a non-linear (exponential) intensity distribution within a CLC film or layer rather than a linear UV absorption distribution shown by the prior art. Further, in the prior art, the materials utilized in the mixtures which result in polarizers are all polymerizable and, the two principal materials which are included in the prior art mixtures are characterized as having different reactivities. Also, in the prior art, when a dye is not utilized, a diffusion gradient is not established and both materials are polymerized, resulting in a narrow band polarizer. In the present approach, in addition to the non-linear intensity distribution of radiation, the segregation rate of the liquid crystal material must be greater than the polymerization rate of the polymerizable material. No dye is required. Simple mixing of the CLC material and the second liquid crystal material with a photoinitiator and exposure to actinic radiation are all that is required to produce polarizers having bandwidths approaching 2,000 nm. Apart from the above, either the liquid crystal material or the CLC material may be in the liquid state in the finally formed polarizers. Finally, the super broadband polarizers of the present invention may be made using commercially available materials provided the segregation rate of the liquid crystal is greater than the polymerization rate of the material being polymerized.

With the above criteria in mind, a polymer having a cholesteric order and a second liquid crystal material are mixed with a photoinitiator. After mixing at a temperature which keeps the materials in a liquid state and before polymerization, the second liquid crystal is weakly bound to the polymer. When subjected to actinic radiation, polymerization causes the weakly bound liquid crystal to segregate from the CLC polymer and begins to diffuse. The second liquid crystal diffuses to swollen regions of the CLC polymer forming second liquid crystal-rich sites. The departure of second liquid crystal from other regions of the CLC polymer leaves liquid crystal-depleted sites. Because the radiation intensity due to light attenuation by the materials involved is non-linear (more specifically, an exponential) in character and the higher intensity regions of CLC polymer are more swollen than lower intensity regions, the second liquid crystal material diffuses preferentially to sites of higher radiation intensity and assumes a non-linear distribution in the polymer CLC material. In this application, an exponential distribution is preferentially generated.

Figure 1:
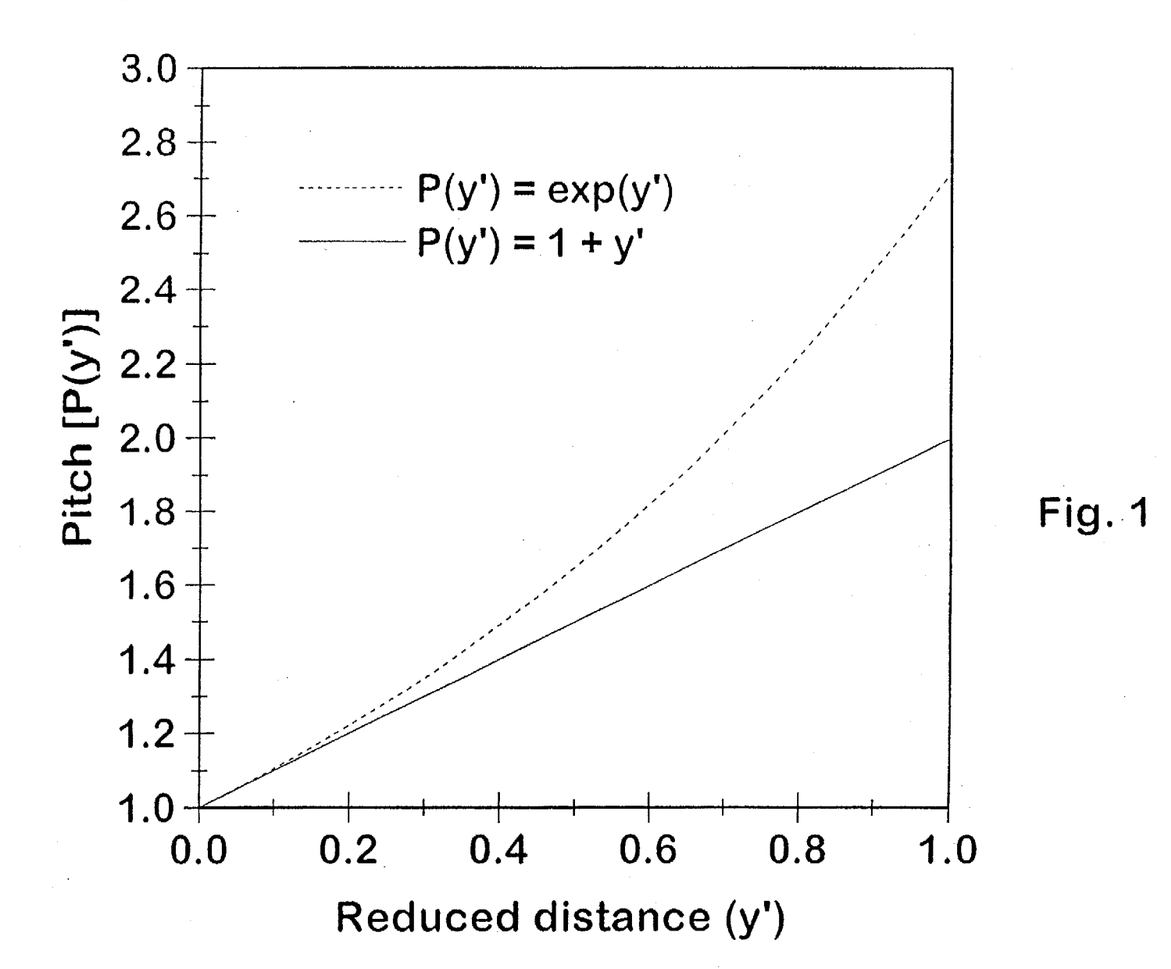
FIG. 1 is a graph of the pitch variation inside a broad band polarizer as a function of reduced distance. The dashed line represents an exponential variation; while the solid line represents a linear variation.

The non-linear distribution of the resulting pitch variation across the polarizer can be understood as one of the main reasons for generating a super broadband polarizer in this application. FIG. 1 illustrates a comparison of a linear pitch distribution $P_l(y^1)$ to the exponential pitch distribution $P_e(y^1)$ as a function of reduced distance, $y^1$. The linear distribution is defined as:

$$P_l(y^1)=1+y^1=1+y/d, \quad (1a)$$

and the exponential distribution is expressed as:

$$P_e(y^1)=\exp[y^1] \quad (1b)$$

respectively, where d is the film thickness. It is seen that the rate of change of pitch function in the exponential function is much steeper than the rate of change of the linear function. For the same thickness, the bandwidth of the polarizer in which the pitch follows an exponential distribution would be much broader than that of a polarizer the pitch of which is linearly distributed.

Figure 2:
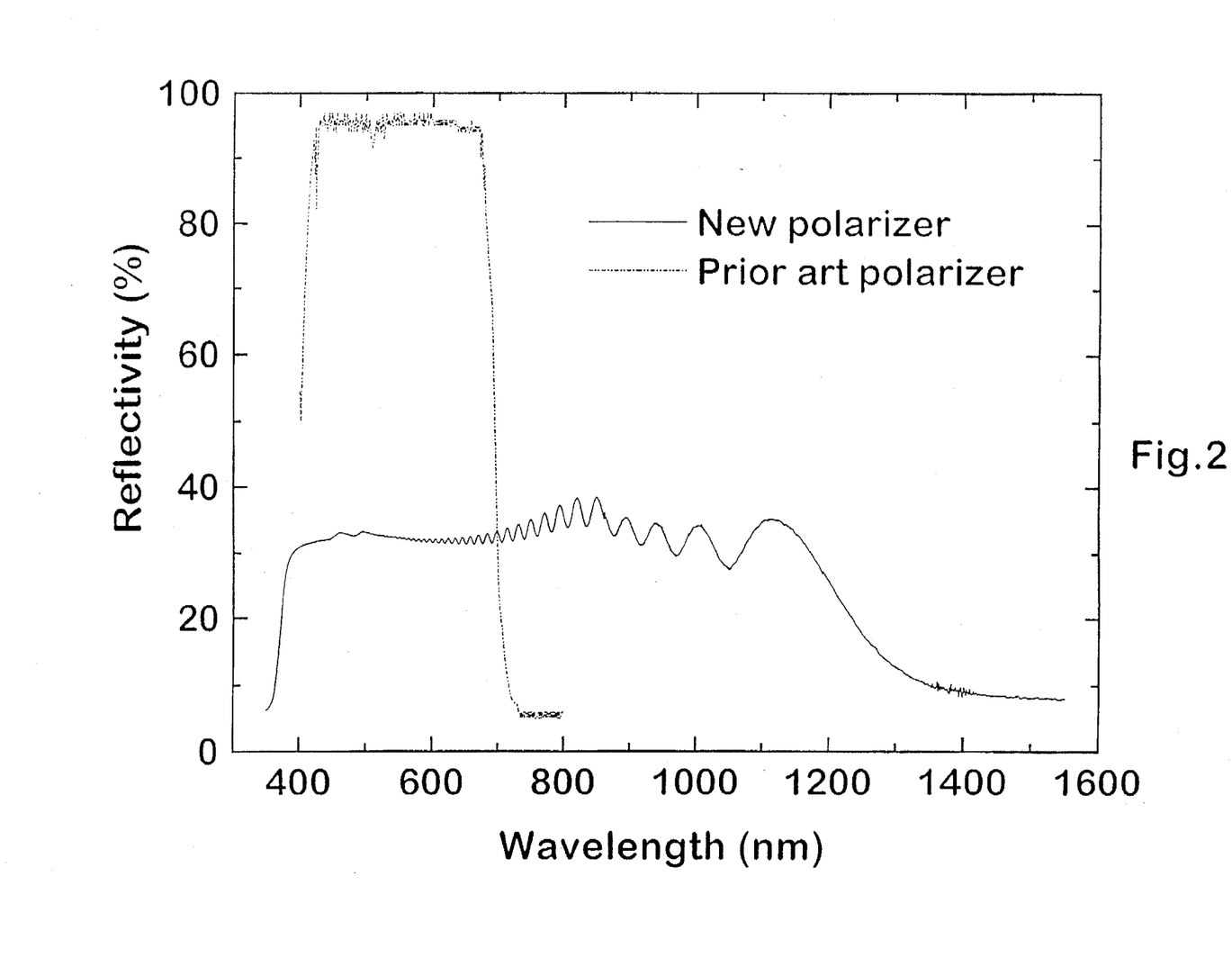
FIG. 2 is a plot of reflectivity vs wavelength comparing the bandwidths of the prior art and the polarizers of the present application.

This fact is shown by comparing the typical bandwidth of a polarizer of one example in of this application with that in the prior art technology (see FIG. 2). In FIG. 2, the reflection spectrum of the prior art polarizer (represented by dashed line) was obtained with a circularly polarized beam which fits the helix sense of the polarizer. However, the spectrum of the polarizer in this application (represented by the solid line) was measured by an un-polarized beam. An observation of FIG. 2 clearly shows that the bandwidth of a polarizer fabricated in accordance with the teaching of the present application is over twice of the prior art polarizer.

Figure 3:
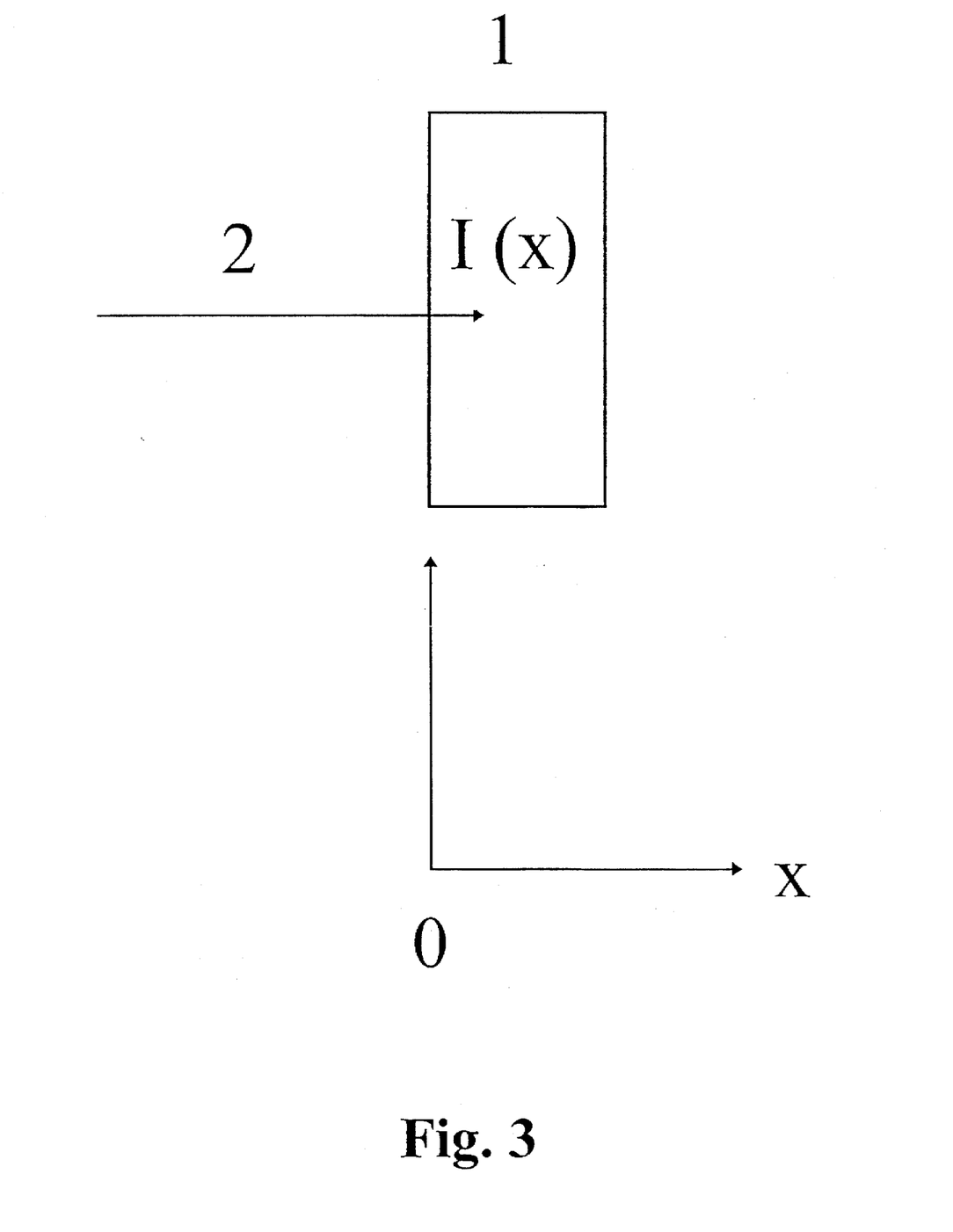
FIG. 3 is a cross-sectional view of a layer of a polymer having a cholesteric order, like a cholesteric liquid crystal (CLC) on which electromagnetic radiation, like actinic light (Io), is incident. The actinic light, in the form of ultraviolet light has an intensity, I(x), at position "x" inside the CLC layer. A nematic material, like a liquid crystal and a photoinitiator are also in the layer or film.
Figure 4:
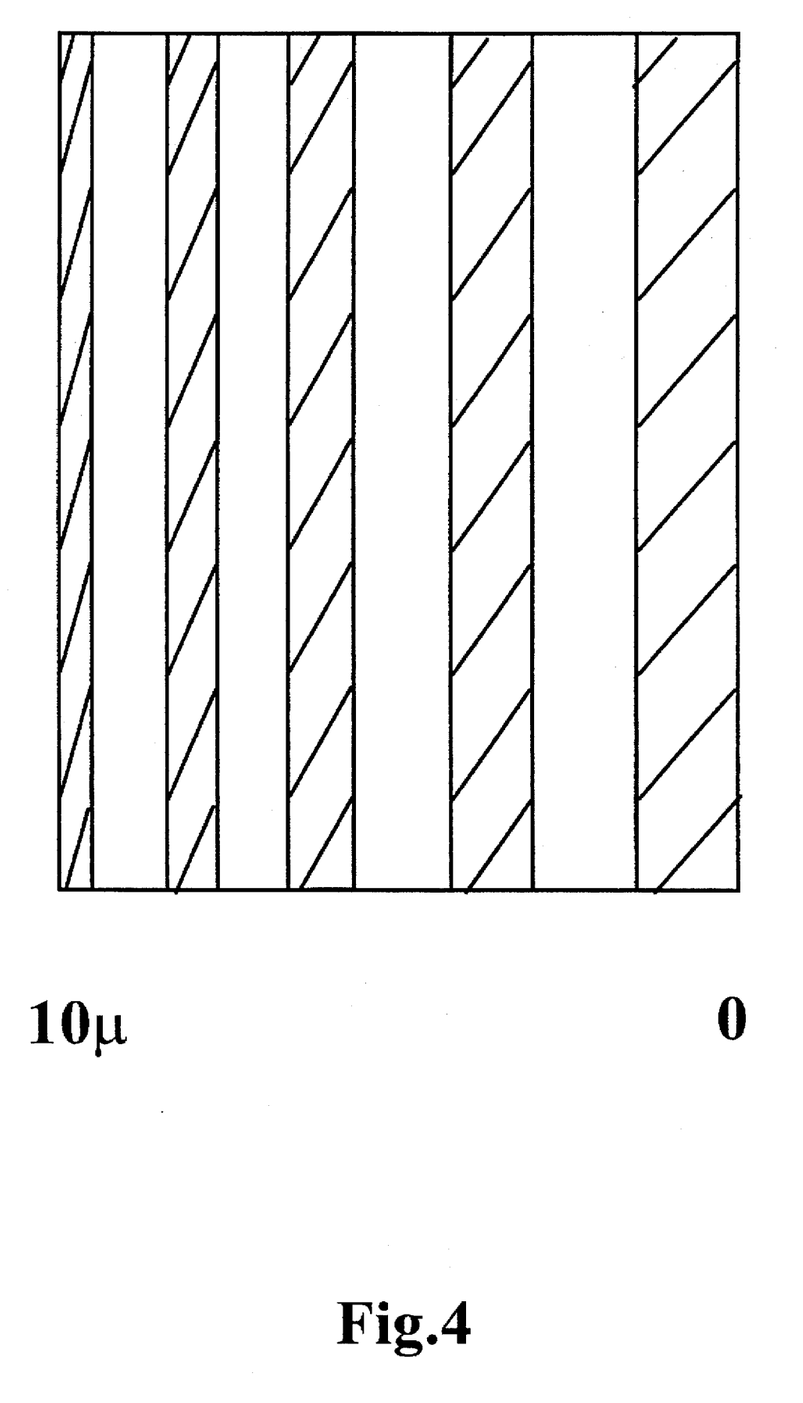
FIG. 4 is a schematic drawing of an Atomic Force Microscope (AFM) image obtained using AFM technology which measures pitch distribution in a polymerized CLC film. Half of the CLC pitch is determined by the distance between any pair of dark lines.
Figure 5:
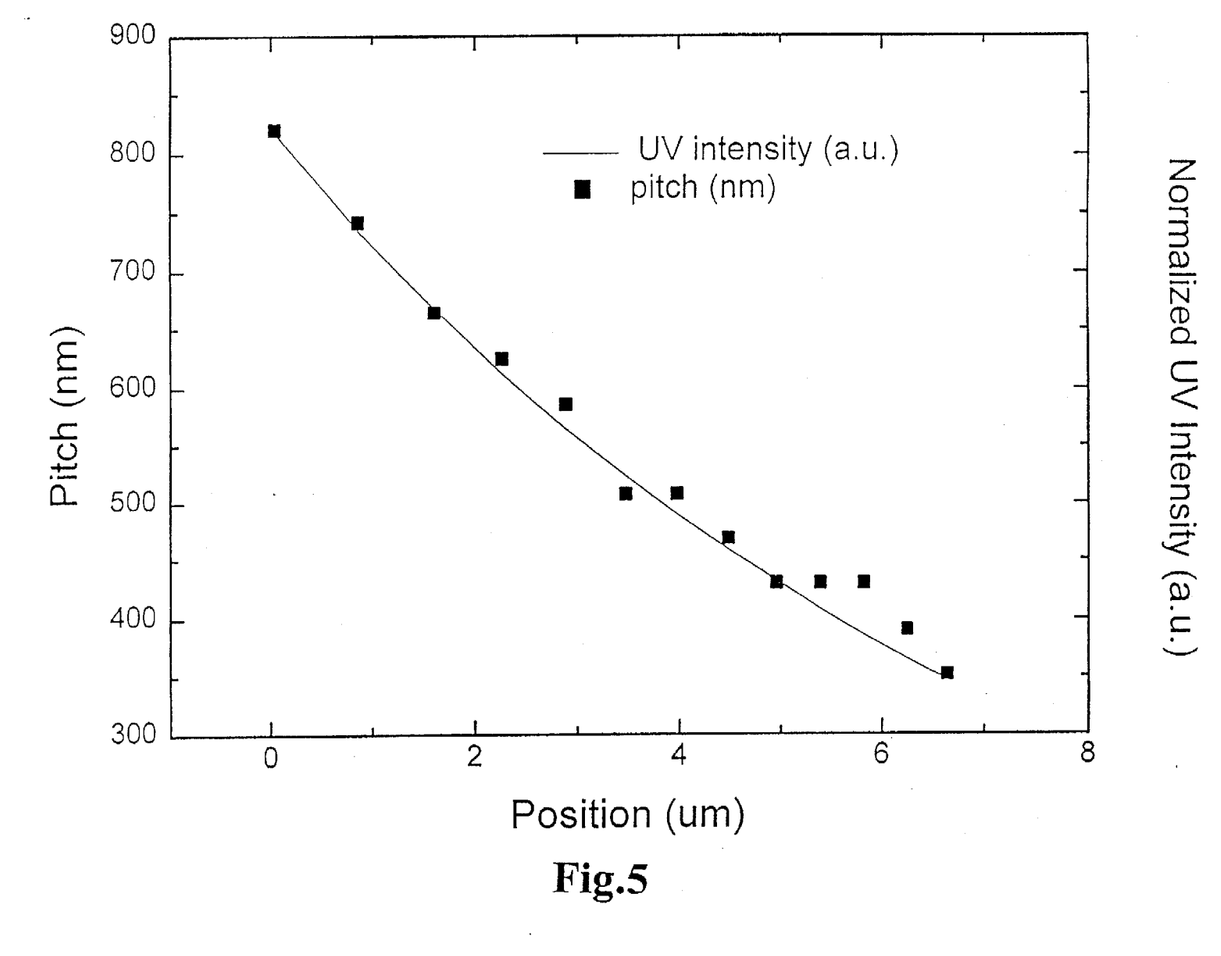
FIG. 5 is a graphical representation of pitch variation across a CLC film or layer and the normalized UV intensity decay across the same film or layer.

The above described mechanism is further supported, at least in terms of the resulting super broadband polarizers, by a consideration of FIGS. 3-5. FIG. 3 is a cross-sectional view of a layer or film of a polymer having a cholesteric order, like a cholesteric liquid crystal, on which electromagnetic radiation like actinic or ultraviolet light, $I_o$, is incident. Film or layer 1 also includes a nematic liquid crystal and a photoinitiator. Radiation 2, in the form of ultraviolet light has an intensity, I(x), at some position "x" inside CLC layer 1. Assuming an ultraviolet absorbent coefficient, $\alpha$, the following equation (2) can be derived in a well known manner:

$$I(x)=I_o \exp(-\alpha x) \quad (2)$$

where the absorbent coefficient $\alpha$ includes all light loss sources, such as absorption, scattering, etc. The solution to equation (2) shows an exponential decay in intensity from the front surface to the back surface of layer or film 1.

Considering now FIG. 4, there is shown a drawing of an Atomic Force Microscope (AFM) image which measures pitch distribution in a polymerized CLC layer or film like layer 1 of FIG. 3. In FIG. 4, the front of CLC film or layer 1 is disposed on the right hand side of the drawing. The pitch variation is shown over an arbitrary range of 0–10 µm to indicate the scale of the values involved. Using a cross-section of polymerized layer 1, a probe is scanned across the thickness of the sample and current variations are produced in the probe in response to the pitch variation which is related to the amounts of the liquid crystal which have segregated and diffused during exposure of film 1 to actinic or ultraviolet light. Because the intensity of radiation is the greatest of the right-hand side of film 1, one would expect greater swelling of the CLC material at regions of higher intensity thereby providing sites for the greater accumulation of diffusing liquid crystal material at these sites. As a result, a longer pitch is formed. Of course, at regions of lower and lower intensity, less and less swelling occurs and less and less accumulation of diffusing liquid crystal occurs, resulting in a shorter pitch. When polymerization has gone to completion, film 1 exhibits a non-linear variation in pitch which, in turn, permits the total reflection of incident light over a very large bandwidth. The regions of greater pitch, of course, reflect lower frequencies than the regions of smaller pitch which reflect higher frequencies. The difference between the highest frequency reflected and the lowest frequency is the bandwidth of the polarizer.

That the pitch variation is indeed non-linear (here, it is exponential) can be seen from a consideration of FIG. 5, which is graphical representation of the ultraviolet light intensity decay of equation (1) versus the measured pitch variation of FIG. 4 across the film or layer of FIG. 3. The solid curve in FIG. 5 is a plot of equation (2) using a UV absorbent coefficient "$\alpha(\alpha=0.13 \ \mu m^{-1})$" which was measured in an independent measurement of layer or film 1. The scale of the curve has been arbitrarily normalized. The variation in pitch as determined from FIG. 4 is also plotted in FIG. 5. Half of the pitch in CLC film 1, at any point; is determined by the distance between any pair of black or white lines in FIG. 4. Pitch in nanometers (nm) is plotted versus position in micrometers (µm) and the square dots show the value of pitch at selected points in FIG. 5. From FIG. 5, it is seen that the non-linear CLC pitch variation across film or layer 1 follows the exponential decay of the solid line curve of the UV intensity caused by light loss. This clearly shows that the pitch of CLC film 1 at any point through the thickness of film 1 is directly proportional to the radiation intensity at that point and that the total pitch variation across layer 1 is exponential in character.

Generally speaking, in carrying out the teaching of the present application side-chain cyclic liquid crystal polysiloxanes having a cholesteric order (CLC) are utilized. The CLC's are commercially available from Wacker GmbH, Germany, and are polymerized by ultraviolet radiation via a cationic polymerization process in the presence of a suitable photoinitiator. The CLC material is available in blue (CC4039L) and red (CC4070L) compounds both of which have a left-handed spiral structure. The blue compound reflects unpolarized light at 390 nm and the red compound reflects unpolarized light at 690 nm after UV curing at 70° C. The CLC material is also available in a right-handed spiral structure, such as CLC polysiloxane (CC4039R) of blue compound. When this compound is mixed with the left-handed CLC, like CC4039L, in a suitable ratio, the resulting film reflects right-handed circularly polarized light when cured at 70° C. The raw CLC material, before curing, exhibits a rubbery state at room temperature and turns to liquid at around 70° C. Nematic liquid crystal materials such as E31LV and E7 are commercially available from EM Industries, Germany.

In the following examples, the CLC polysiloxane, the nematic liquid crystal, the photoinitiator, and in one example, a chiral additive were weighed in a desired ratio and mixed together on a hot plate. The mixtures were introduced into a glass cell that had a buffed polyimide coating for better molecular alignment. Finally, the mixture was cured or polymerized at a selected temperature by exposing the mixture to actinic light for a time sufficient to permit polymerization to go to completion.

After polymerization, spectral analysis of the resulting samples was carried out on a Perkin-Elmer, Lambda 19 spectrophotometer. Both transmission and reflection spectra were taken with the left-hand, right-hand and unpolarized light.

EXAMPLE 1

In this example, the red compound of CLC polysiloxane (CC4070L) mentioned above, is blended with E31 nematic liquid crystal, also mentioned above. The red CC4070L has a left-handed twist sense and reflects at 690 nm when cured at 70° C. The mixture contains E31/CC4070L in a ratio of 1/2 by weight with 0.6% IG184 photoinitiator by weight. Photoinitiator IG184 is commercially available from Ciba Geigy, Hawthorne, N.Y. The mixture is introduced into a 20μ, glass cell and cured at an ultraviolet intensity of 0.047 mW/cm² at a temperature, provided by a hot plate, of 92° C. In this example, only the CLC polysiloxane material is polymerized while the nematic liquid crystal remains in the liquid state. The resulting polarizer covered a spectral band pass from 560 nm to 2160 nm providing a super bandwidth polarizer of 1600 nm.

EXAMPLE 2

In this example, the blue compound of CLC polysiloxane (CC 4039L) and nematic liquid crystal (E31) are mixed in a ratio of 2:1 by weight along with photoinitiator (IG184) of 0.6% by weight: A 20μ glass cell is used to provide a film of that thickness. The CLC is cured by a UV lamp of 0.047 mW/cm² at 92° C. The resulting polarizing layer covered a spectral band pass from 370 nm to 1,200 nm providing a super bandwidth polarizer of 830 nm, covering the whole visible and near IR spectral band. As with Example 1, the liquid crystal material (E31) remains in the liquid state after curing.

EXAMPLE 3

The two previous example utilized CLC polysiloxanes which had a left-handed twist sense. In this example, a CLC polysiloxane which has a right-handed twist sense is utilized. A blue compound (CC4070R) with such a twist sense is commercially available from Wacker, GmbH, Germany and reflects right-handed circular light at 390 nm when cured at 70° C. A nematic liquid crystal material (M15) commercially available from EM Industries, Germany, is mixed with the CLC polysiloxane material (CC 4039R) in a ratio of 1:2 by weight with 1% IG184 photoinitiator by weight. The mixture is sandwiched between the plates of a 20μ glass cell and cured at a UV intensity of 0.047 mW/cm² at 122° C. The resulting polarizer, reflective of right-hand circularly polarized light, covered a spectral band pass from 520 nm to 920 nm providing a super broad bandwidth polarizer of 400 nm. Here, the non-polymerizable liquid crystal (M-15) is in the solid state at room temperature after curing.

EXAMPLE 4

In this example, the CLC material utilized is nonpolymerizable while the nematic liquid crystal is polymerizable providing a super broadband polarizer in which the CLC is in the liquid crystal state after curing. To create a suitable nonpolymerizable CLC material, the liquid crystal material E31 is mixed with another liquid crystal material ZLI-2309 and a chiral additive S 1011 all of which are commercially available from EM Industries, Germany. The resulting nonpolymerizable CLC material is of low molecular weight and the chiral additive induces a left-handed spiral structure in the mixture. E31/ZLI-2309/S1011 are mixed together in a ratio of 1/1/0.2 by weight. The CLC material is then mixed with a polymerizable nematic liquid crystal polymer material CN 4000 in a ratio of 1:2 by weight. CN 4000 is commercially available from Wacker GmbH, Germany. The mixture along with a photoinitiator IG10184 of 0.6% by weight is introduced into a cell formed from two pieces of rubbed polyimide coated glass substrates 20μ, apart and cured at a UV intensity of 0.047 mW/cm² at a temperature of 70° C. Here this nematic liquid crystal material CN4000, polymerizes while the low molecular weight CLC material remains in the liquid state. As with the other examples, the segregation rate of the liquid crystal material is greater than its polymerization rate. The resulting polarizer is reflective of left-handed circularly polarized radiation and covers a spectral band pass from 430 nm to 1050 nm providing a super broad bandwidth polarizer of 620 nm.

EXAMPLE 5

In this example, the CLC material utilized is a polymerizable polysiloxane CLC (CC4039L) commercially available from Wacker, GbmH, Germany mixed with a nonpolymerizable nematic E7 and a chiral additive R1011 both of which are commercially available from EM Industries, Germany. The CLC polymer material (CC4039L) has a left-handed twist structure while the chiral additive (R1011) has a right-handed twist structure. The materials E7/CC4039L/R1011/IG184 are present in a mixture in ratios of 1/2/0.1/0.012 by weight. IG184 is a photoinitiator. The mixture was introduced into a 20μ thick glass cell with a rubbed polyimide coating and was cured at a UV intensity of 0.047 mW/cm² at 82° C. In this example, the cholesteric liquid crystal material (CC4039L) polymerizes while the nematic (E7) remains in the liquid state after curing. As with the other examples, the segregation rate of the nonpolymerizable liquid crystal is greater than the polymerization rate of the nematic. The resulting broad band polarizer film is reflective of left-handed circularly polarized radiation and covers a spectral band pass from 800 nm to 1428 nm, providing a super broad bandwidth polarizer of over 600 nm in the near infrared (IR) region of the electromagnetic spectrum. In this example, the chiral additive is utilized to control the band position and different concentrations will control the band passes available.

Bandwidth as well as the spectral position of the polarizers of the present application can be controlled in the following additional ways.

The first approach utilizes different film thickness to control spectral bandwidth. Using the materials E31/CC4039L=1:2 by weight with 0.6% IG184, polarizer bandwidth is increased from 580 nm to 800 nm when the film thickness is changed from 5 to 20μ. The polarizer films are cured under a UV intensity of 0.047 mW/cm² at 92° C.

The second approach uses changes in chiral additive concentration. The material is E31/CC4039L=1:2 by weight with 0.6% IG184. The film thickness is 20μ. All the polarizer films are cured under a UV intensity of 0.047 mW/cm² at 70° C. The bandwidth is decreased from 980 nm to 460 nm when the S1011 chiral additive concentration is increased from 0 to 6.6%. In addition, the center wavelength has a "blue" shift toward to shorter wavelength with the increase in chiral concentration.

The third approach controls the polarizer spectrum with changes in curing temperature. The material is E31/CC4039L=1:2 by weight with 0.6% IG184. The film thickness is 20μ. Samples are cured under a UV intensity of 0.047 mW/cm$^2$. The center wavelength has a "red" shift toward a longer wavelength if the curing temperature is lowered from 92° C. to 70° C.

The fourth approach utilizes changes in photoinitiator concentration. The materials are E31/CC4039L=1:2 by weight. The film thickness is 20μ. Samples are cured under a UV intensity of 0.047 mW/cm$^2$ at 92° C. Generally, increasing the photoinitiator (IG184) concentration decreases the bandwidth of the polarizer.

While the above described examples demonstrate that commercially available CLC and liquid crystal materials may be utilized to fabricate super broad band polarizers. It should be appreciated that the present technique is applicable for use with any cyclic liquid crystal siloxane wherein the mesogenic group is attached to a siloxane backbone by hydrosilylation.

Similarly, while the nematics utilized in the above examples are all commercially available, it should also be appreciated that any low molecular weight, nonpolymerizable nematic liquid crystal may be utilized in the practice of the present invention. Also, as shown in Example 4, polymerizable nematics may be used as long as their diffusion rate is greater than their polymerization rate.

The nematics utilized may be single compound liquid crystals like K15, K24 and M15 which are commercially available from EM Industries, Germany. Multiple compound mixtures of liquid crystal materials like E31 and E7 commercially available from EM Industries, Germany, and ZLI-2309 and ZLI-5800-100 commercially available from EM Industries, Germany, may also be utilized in the practice of the present invention. All of these liquid crystals are nematic at room temperature except K24 which is a smectic at room temperature. These liquid crystals, when combined with a CLC polymer material and a photoinitiator produce polarizers of super broad bandwidth of at least 700 nm. Finally, at low concentrations of liquid crystal material in the CLC polymer material, smaller than a ratio of 1/6 by weight, the resulting bandwidth falls off sharply indicating that low concentrations of nematic material are a limiting factor. Also, it should be appreciated that high concentrations of nematic to CLC, like a ratio of 2/3, impact reflection because of scattering.

In above examples, specific UV intensities were prescribed to provide broadband polarizers. To the extent that polymerization rate is linked to the intensity of incident UV radiation, when a nematic like E7 is used with a CLC material like CC4039L in a ratio of 1/2, the bandwidth of the resulting polarizer decreases as the UV intensity increases. At an intensity of 0.047 mW/cm$^2$, for example, the resulting bandwidth is 980 nm. At an intensity of 0.97 mW/cm$^2$, the resulting bandwidth is 700 nm and, at 7.1 mW/cm$^2$, the resulting bandwidth is 280 nm. This clearly indicates that bandwidth can be controlled by controlling the intensity of UV radiation.

While the preferred embodiments have been characterized as having an exponential distribution of liquid crystal at similarly exponentially distributed sites in a CLC polymer, it should be appreciated that departures from an exact exponential distribution can be tolerated without departing from the spirit of the present invention. Thus, impurities in the materials, radiant energy variations and polymerization variations may cause a departure from an ideal exponential function providing liquid crystal distributions across the thickness of the resulting polarizers which can only be described as being non-linear in character. Departures from the ideal exponential function do not appear to affect the enhancements in bandwidths obtained when the distribution is exponential.

The single layer polarizers of the present application can be fabricated to cover a broad portion of the electromagnetic spectrum including visible, infrared and ultraviolet ranges. From all the foregoing, it should be seen that super broadband polarizers may be obtained using the technique of the present application without the use of dyes or diffusion gradients in the polarizer CLC material.

What is claimed:

1. A broadband polarizer comprising a film of at least one material having a cholesteric order which includes sites of non-linearly varying helix pitch distributed across the thickness of said film and at least one liquid crystal material distributed across the thickness of said film and disposed at said sites said film having a given bandwidth.

2. A broad band polarizer according to claim 1 wherein said non-linearly varying helix pitch is an exponentially varying pitch.

3. A broadband polarizer according to claim 1 wherein said material having a cholesteric order is a polymer.

4. A broadband polarizer according to claim 1 wherein said material having a cholesteric order is a monomer.

5. A broadband polarizer according to claim 1 wherein said material having a cholesteric order is an oligomer.

6. A broadband polarizer according to claim 1 wherein said at least one said liquid crystal material is a nematic liquid crystal.

7. A broadband polarizer according to claim 1 wherein said at least one liquid crystal material is a smectic liquid crystal.

8. A broadband polarizer according to claim 1 wherein said at least one material having a cholesteric order is photopolymerizable.

9. A broadband polarizer according to claim 1 wherein said at least one liquid crystal material is photopolymerizable.

10. A broadband polarizer according to claim 1 wherein at least one of said at least one material having a cholesteric order and said at least one liquid crystal material is polymerizable.

11. A broadband polarizer according to claim 1 wherein the segregation rate of said at least one liquid crystal material is greater than the polymerization rate of whichever of said materials is polymerized.

12. A broadband polarizer according to claim 1 wherein the segregation rate of said at least one liquid crystal material, is greater than the polymerization rate of said at least one material having a cholesteric order.

13. A broadband polarizer according to claim 1 wherein the segregation rate of said at least one material having a cholesteric order is greater than the polymerization rate of said least one liquid crystal material.

14. A broadband polarizer according to claim 1 wherein said at least one material having a cholesteric order is a cholesteric liquid crystal.

15. A broadband polarizer according to claim 1 wherein said at least one material having a cholesteric order is a cyclic liquid crystal siloxane.

16. A broadband polarizer according to claim 1 wherein said at least one material having a cholesteric order is a material which is polymerized by cationic polymerization.

17. A broadband polarizer according to claim 1 wherein said at least one liquid crystal material is a material which is polymerized by cationic polymerization.

18. A broadband polarizer according to claim 1 wherein said at least one liquid crystal material is a low molecular weight material having a cholesteric order.

19. A broadband polarizer according to claim 1 wherein said film has a thickness sufficient to reflect 100 percent of incident circularly polarized electromagnetic radiation over said given bandwidth.

20. A broadband polarizer according to claim 1 wherein said film is reflective of incident circularly polarized electromagnetic radiation in the visible spectrum.

21. A broadband polarizer according to claim 1 wherein said film is reflective of incident circularly polarized electromagnetic radiation in the infrared portion of the electromagnetic spectrum.

22. A broadband polarizer according to claim 1 wherein said film is reflective of incident circularly polarized electromagnetic radiation in the ultraviolet portion of the electromagnetic spectrum.

23. A broadband polarizer according to claim 1 wherein at least one of said at least one material having a cholesteric order and said at least one liquid crystal material is in an anisotropic liquid state.

24. A broadband polarizer according to claim 1 wherein at least one of said at least one material having a cholesteric order and said at least one liquid crystal material is in the solid state.

25. A broadband polarizer according to claim 1 wherein at least one material having a cholesteric order is unpolymerized.

26. A broadband polarizer according to claim 1 wherein said at least one liquid crystal material is unpolymerized.

27. A broadband polarizer according to claim 1 wherein at least one of said at least one material having a cholesteric order and said at least one liquid crystal material is unpolymerized.

28. A broadband polarizer according to claim 1 wherein said given bandwidth is in excess of 400 nm.

29. A broadband polarizer according to claim 1 wherein said given bandwidth is in a range of over 400 nm to 2000 nm.

30. A method of fabricating a broadband polarizer comprising the step of:
  converting a mixture of at least one material having a cholesteric order and sites of a given helix pitch and at least one liquid crystal material such that said at least one liquid crystal material having a cholesteric order is converted to a film wherein said sites of given helix pitch are changed to sites of nonlinearly varying helix pitch across the thickness of said film and wherein said at least one liquid crystal material is distributed across the thickness of said film and disposed at said sites of nonlinearly varying pitch.

31. A method according to claim 30 wherein said at least one material having a cholesteric order is a polymer.

32. A method according to claim 30 wherein said at least one material having a cholesteric order is a monomer.

33. A method according to claim 30 wherein said at least one material having a cholesteric order is an oligomer.

34. A method according to claim 30 wherein said at least one material having a cholesteric order is a low molecular weight material.

35. A method, according to claim 30 wherein said at least one liquid crystal material is a nematic liquid crystal.

36. A method according to claim 30 wherein said at least one liquid crystal material is a smectic liquid crystal.

37. A method according to claim 30 wherein said at least one material having a cholesteric order is photopolymerizable.

38. A method according to claim 30 wherein said at least one liquid crystal material is photopolymerizable.

39. A method according to claim 30 wherein at least one of said at least one material having a cholesteric order and said at least one liquid crystal material is polymerizable.

40. A method according to claim 30 wherein the segregation rate of said at least one liquid crystal material is greater than the polymerization rate of whichever of said materials is polymerized.

41. A method according to claim 30 wherein the segregation rate of said at least one liquid crystal material is greater than the polymerization rate of said at least one material having a cholesteric order.

42. A method according to claim 30 wherein the segregation rate of said at least one liquid crystal material is greater than its polymerization rate.

43. A method according to claim 30 wherein said at least one material having a cholesteric order is a cholesteric liquid crystal.

44. A method according to claim 30 wherein said at least one material having a cholesteric order is a cyclic liquid crystal.

45. A method according to claim 30 wherein said at least one material having a cholesteric order is a material which is polymerized by cationic polymerization.

46. A method according to claim 30 wherein said at least one liquid crystal material is a material which is polymerized by cationic polymerization.

47. A method according to claim 30 wherein said at least one liquid crystal material having a cholesteric order is a low molecular weight material.

48. A method according to claim 30 wherein said film has a thickness sufficient to reflect 100 percent of incident circularly polarized electromagnetic radiation over said given bandwidth.

49. A method according to claim 30 wherein said film is reflective of incident circularly polarized electromagnetic radiation in the visible spectrum.

50. A method according to claim 30 wherein said film is reflective of incident circularly polarized electromagnetic radiation in the infrared portion of the electromagnetic spectrum.

51. A method according to claim 30 wherein said film is reflective of incident circularly polarized electromagnetic radiation in the ultraviolet portion of the electromagnetic spectrum.

52. A method according to claim 30 wherein at least one of said at least one material having a cholesteric order and said at least one liquid crystal material is in an anisotropic liquid state.

53. A method according to claim 30 wherein at least one of said at least one material having a cholesteric order and said at least one liquid crystal material is in the solid state.

54. A method according to claim 30 wherein at least one material having a cholesteric order is unpolymerized.

55. A method according to claim 30 wherein at least one liquid crystal material is unpolymerizable.

56. A method according to claim 30 wherein at least one of said at least one material having a cholesteric order and said at least one liquid crystal material is unpolymerizable.

57. A method according to claim 30 wherein the step of converting includes the step of:
  mixing said at least one material having a cholesteric order and said at least one liquid crystal material in a given ratio by weight to form a mixture.

58. A method according to claim 57 wherein said given ratio by weight is 2:1.

59. A method according to claim 57 wherein said given ratio by weight of said at least one material having a cholesteric order and said at least one liquid crystal material is in a range of 1:1 to 6:1.

60. A method according to claim 57 further including the step of adding a photoinitiator into said mixture.

61. A method according to claim 60 further including the step of adding a chiral additive to said mixture.

62. A method according to claim 61 further including the step of heating said mixture at a temperature sufficient to maintain said mixture in a liquid state.

63. A method according to claim 62 further including the step of irradiating said mixture with electromagnetic radiation to polymerize at least one of said at least one material having a cholesteric order and said at least one liquid crystal material.

64. A method according to claim 63 wherein the step of irradiating said mixture includes the step of applying actinic radiation to said mixture.

65. A single layer polarizer comprising:

a film of a first liquid crystal material and a second liquid crystal material, one of said materials having sites of nonlinearly varying helix pitch distributed across the thickness of said film the other of said materials being distributed across the thickness of said film and disposed at said sites.

66. A method of forming a single layer polarizer comprising the steps of:

forming a film from a first liquid crystal material and a second liquid crystal material, one of said materials having sites of nonlinearly varying helix pitch distributed across the thickness of said film the other of said materials being distributed across the thickness of said film and disposed at said sites.

67. A broadband polarizer comprising a film of at least one material having a cholesteric order which includes sites of nonlinearly varying helix pitch distributed across the thickness of said film and at least one liquid crystal material distributed across the thickness of said film and disposed at said sites at least one of said materials being unpolymerized, said film having a given bandwidth.

68. A broadband polarizer comprising a film of at least one material having a cholesteric order which includes sites of varying helix pitch distributed across the thickness of said film and at least one liquid crystal material distributed across the thickness of said film and disposed at said sites at least one of said materials being unpolymerized, said film having a given bandwidth.

* * * * *